United States Patent
Komatsu et al.

(10) Patent No.: US 11,654,778 B2
(45) Date of Patent: May 23, 2023

(54) ELECTRIC VEHICLE CONTROL METHOD AND ELECTRIC VEHICLE CONTROL DEVICE

(71) Applicant: NISSAN MOTOR CO., LTD., Yokohama (JP)

(72) Inventors: Hiroyuki Komatsu, Kanagawa (JP); Jun Motosugi, Kanagawa (JP); Akira Sawada, Kanagawa (JP); Yui Ito, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/625,443

(22) PCT Filed: Mar. 6, 2020

(86) PCT No.: PCT/JP2020/009868
§ 371 (c)(1),
(2) Date: Jan. 7, 2022

(87) PCT Pub. No.: WO2021/176731
PCT Pub. Date: Sep. 10, 2021

(65) Prior Publication Data
US 2022/0258617 A1 Aug. 18, 2022

(51) Int. Cl.
*B60L 15/20* (2006.01)
(52) U.S. Cl.
CPC ........... *B60L 15/20* (2013.01); *B60L 2240/12* (2013.01); *B60L 2240/423* (2013.01); *B60L 2240/642* (2013.01)
(58) Field of Classification Search
CPC ............... B60L 15/20; B60L 2270/145; B60L 2240/463; B60L 2240/461; B60L 15/2054;
(Continued)

(56) References Cited

U.S. PATENT DOCUMENTS

| 2013/0073145 | A1* | 3/2013 | Kobayashi | B60W 30/02 701/37 |
| 2013/0080012 | A1* | 3/2013 | Kobayashi | B60W 30/02 701/70 |
| 2018/0043792 | A1* | 2/2018 | Sawada | B60L 7/10 |

(Continued)

FOREIGN PATENT DOCUMENTS

| CN | 107206914 A | 9/2017 |
| JP | 2017-085706 A | 5/2017 |

(Continued)

*Primary Examiner* — Behrang Badii
(74) *Attorney, Agent, or Firm* — Foley & Lardner LLP

(57) ABSTRACT

Provided is an electric vehicle control method. The electric vehicle control method includes: a disturbance torque estimation process of calculating a disturbance torque estimation value including an influence of a road surface gradient; a speed parameter acquisition process of acquiring a speed parameter relating to a vehicle speed; a stop process of calculating a stopping basis torque target value so as to converge a torque command value to the disturbance torque estimation value in accordance with a decrease of a speed parameter; and a vibration damping process of calculating a stopping correction torque target value by performing filterring on the stopping basis torque target value. In the vibration damping process, the torque command value is set based on the stopping basis torque target value in a first just-before-stop period set in a relatively high vehicle speed range, and is set based on the stopping correction torque target value in a second just-before-stop period set in a relatively low vehicle speed range.

5 Claims, 13 Drawing Sheets

(58) Field of Classification Search
CPC .............. B60L 15/2018; B60L 3/0076; B60L 2240/642; B60L 2240/423; B60L 2240/12; Y02T 10/72
See application file for complete search history.

(56) References Cited

U.S. PATENT DOCUMENTS

2018/0244157 A1* 8/2018 Hirakawa ............ B60W 10/184
2019/0381895 A1* 12/2019 Shindo ................. B60L 15/2081

FOREIGN PATENT DOCUMENTS

| JP | 2017-085730 A | 5/2017 |
| JP | 2017-175853 A | 9/2017 |
| JP | 2019-022339 A | 2/2019 |
| JP | 6492399 B2 | 4/2019 |
| JP | 2019-180231 A | 10/2019 |
| JP | 2020-010454 A | 1/2020 |

* cited by examiner

S510 ROTATION SPEED FB TORQUE SETTING PROCESS

S520 DISTURBANCE TORQUE ESTIMATION PROCESS

S570 TORQUE COMMAND VALUE CALCULATION PROCESS

ELECTRIC VEHICLE CONTROL METHOD AND ELECTRIC VEHICLE CONTROL DEVICE

TECHNICAL FIELD

The present invention relates to an electric vehicle control method and an electric vehicle control device.

BACKGROUND ART

JP6492399B proposes an electric vehicle control method of performing, just before stop of an electric vehicle, a stop process of converging a motor torque command value to zero in accordance with a decrease in speed and a vibration damping process of suppressing a vibration based on characteristics of a power transmission system of the electric vehicle. In particular, this control method has a control logic of executing the vibration damping process after the stop process. More specifically, a torque target value (second torque target value) determined from the viewpoint of stopping the vehicle is determined in the stop process, and a final motor torque command value is determined by executing the vibration damping process based on this determined torque target value.

SUMMARY OF INVENTION

In the vibration damping process in the control method of JP6492399B, as feedforward compensation for suppressing the vibration caused by the characteristics of the power transmission system, a predetermined linear filter is set to the above torque target value to determine the motor torque command value. However, the inventors of the present invention have found a problem that in this control configuration, a control stability is decreased and a continuous vibration of the vehicle occurs in particular in a stop scene in a specific road surface condition such as a gentle upward gradient.

In view of such circumstances, an object of the present invention is to provide an electric vehicle control method and an electric vehicle control device capable of further improving control stability in a vibration damping process during stopping.

One of an aspect of the present invention, an electric vehicle control method for controlling a motor based on a torque command value in an electric vehicle equipped with the motor as a travelling drive source is provided. The electric vehicle control method includes: a disturbance torque estimation process of calculating a disturbance torque estimation value including an influence of a road surface gradient; a speed parameter acquisition process of acquiring a speed parameter relating to a vehicle speed; and a vehicle state control including a stop process of calculating a stopping basis torque target value so as to converge the torque command value to the disturbance torque estimation value in accordance with a decrease in the speed parameter, and a vibration damping process of calculating a stopping correction torque target value by performing filterring on the stopping basis torque target value. In the vehicle state control, the torque command value is set based on the stopping basis torque target value in a first just-before-stop period set in a relatively high vehicle speed range. The torque command value is also set based on the stopping correction torque target value in a second just-before-stop period set in a relatively low vehicle speed range.

DESCRIPTION OF EMBODIMENTS

Hereinafter, embodiments of the present invention will be described.

Figure 1:
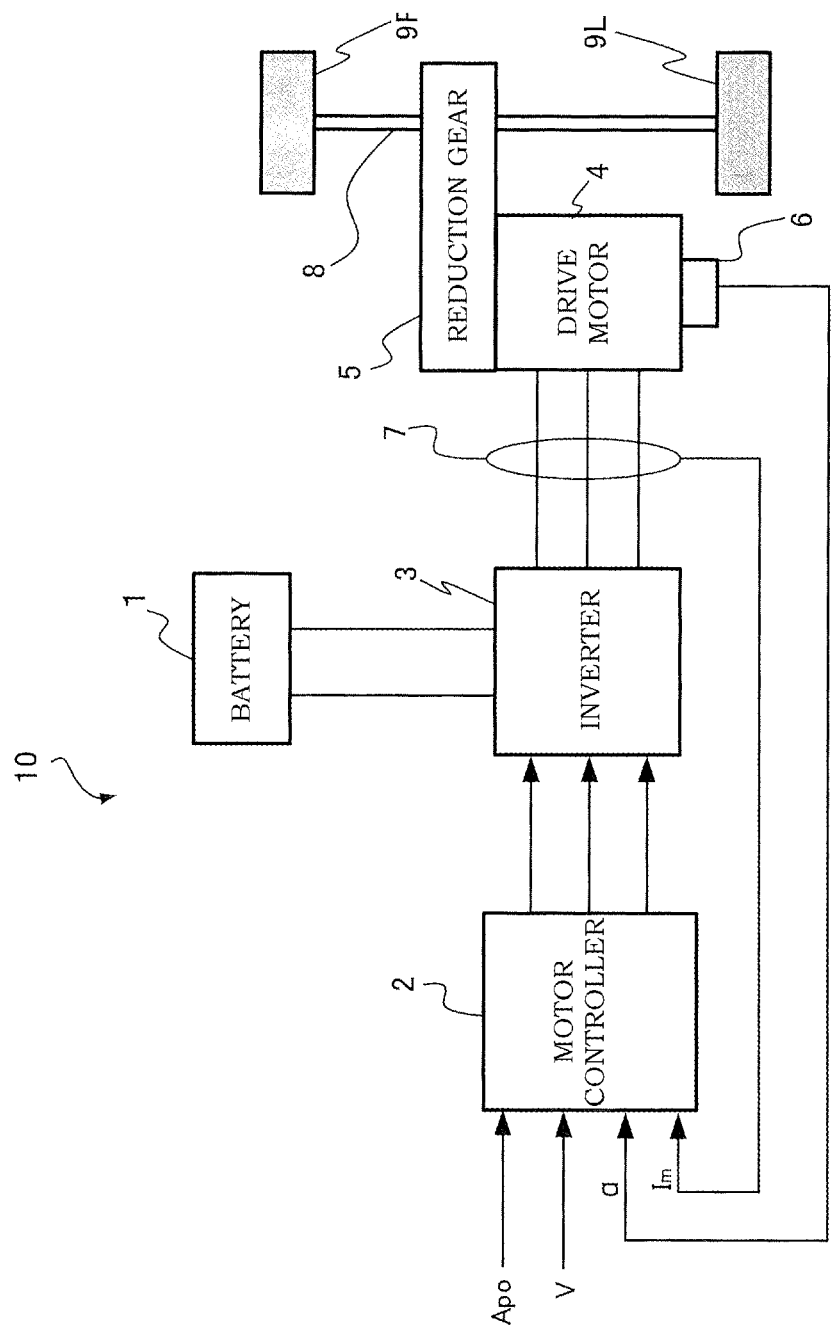
FIG. 1 is a diagram illustrating a configuration of an electric vehicle applied with an electric vehicle control method according to the present embodiment.

FIG. 1 is a block diagram illustrating main configurations of an electric vehicle 10 applied with a control method according to the present embodiment.

It is assumed that the electric vehicle 10 of the present embodiment is provided with a drive motor 4 (electric motor) as a drive source of the vehicle and can travel by a drive force of the drive motor 4. Such a vehicle includes an electric vehicle (EV), a hybrid vehicle (HEV), and the like.

As shown in FIG. 1, the electric vehicle 10 mainly includes a battery 1, a motor controller 2, an inverter 3, the drive motor 4, and various sensors (a rotation sensor 6 and a current sensor 7).

The battery 1 functions as a power source that supplies (discharges) a drive electric power to the drive motor 4, and is connected to the inverter 3 such that the battery 1 can be charged by receiving a supply of a regenerative electric power from the drive motor 4.

The motor controller 2 is a computer constituted by, for example, a central processing unit (CPU), a read-only memory (ROM), a random access memory (RAM), and an input/output interface (I/O interface).

The motor controller 2 receives signals of various vehicle variables showing a vehicle state such as an accelerator position $A_{po}$, a rotor phase $\alpha$ of the drive motor 4, and a current flowing through the drive motor 4 (hereinafter, also simply referred to as a "motor current $I_m$") as digital signals. The motor controller 2 calculates a torque command value $T_m^{}$ as a torque to be output by the drive motor 4 based on the input various signals. The motor controller 2 further generates a PWM signal for driving the inverter 3 based on the calculated torque command value $T_m^{}$.

The inverter 3 includes two switching elements (for example, power semiconductor elements such as an IGBT and a MOS-FET) provided corresponding to the respective phases. The inverter 3 turns on/off the above switching elements based on the PWM signal generated by the motor controller 2, thereby converting a direct current supplied from the battery 1 into an alternating current, or performing inverse conversion, to adjust a current to be supplied to the drive motor 4 to a desired value.

The drive motor 4 is configured as a three-phase AC motor. The drive motor 4 generates the drive force (or regenerative braking force) of the electric vehicle 10 by the alternating current supplied by the inverter 3. The drive force (or regenerative braking force) generated by the drive motor 4 is transmitted to drive wheels 9 (left drive wheel 9*f* and right drive wheel 9*r*) via a power transmission system (a reduction gear 5, a drive shaft 8, and the like) of the electric vehicle 10.

The drive motor 4 recovers a kinetic energy of the vehicle as an electrical energy by generating the regenerative braking force when the drive motor 4 is rotated by the drive wheels 9 when the vehicle is travelling. In this case, the inverter 3 converts an alternating current generated during the regenerative driving into a direct current and then supplies the direct current to the battery 1.

The rotation sensor 6 detects the rotor phase α of the drive motor 4 and outputs the same to the motor controller 2. The rotation sensor 6 includes, for example, a resolver or an encoder.

The current sensor 7 detects phase components of the motor current $I_m$, in particular, phase components including three-phase alternating currents ($i_u$, $i_v$, $i_w$). A sum of the three-phase alternating currents ($i_u$, $i_v$, $i_w$) is zero, and thus by detecting currents of any two phases by the current sensor 7, a current of the remaining one phase may be obtained by calculation. Hereinafter, detection values of the three-phase alternating currents ($i_u$, $i_v$, $i_w$) are also referred to as "three-phase current detection values ($i_{u\_d}$, $i_{v\_d}$, $i_{w\_d}$)".

Hereinafter, various processes relating to the electric vehicle control method according to the present embodiment will be described. The various processes described below are executed by the motor controller 2 in accordance with a program stored in a storage area (such as a ROM).

Figure 2:
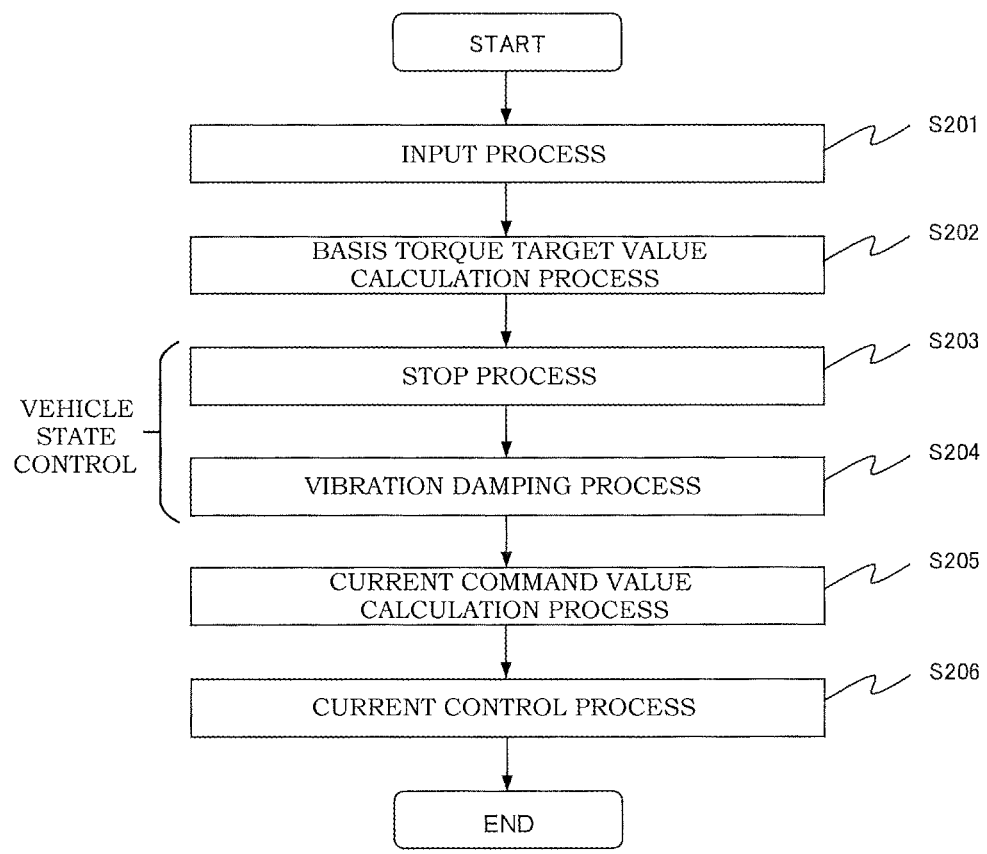
FIG. 2 is a flowchart illustrating overall processes of the electric vehicle control method.

FIG. 2 is a flowchart illustrating overall processes according to the electric vehicle control method of the present embodiment. The following processes are repeatedly executed at a predetermined calculation cycle.

In step S201, the motor controller 2 performs an input process of acquiring various parameters used for executing processes of step S202 and subsequent steps.

Specifically, the motor controller 2 acquires the accelerator position $A_{po}$ (%), the rotor phase α [rad], the three-phase current detection values ($i_{u\_d}$, $i_{v\_d}$, $i_{w\_d}$) [A], and a direct current voltage value $V_{dc}$ [V] of the battery 1 by communication with the above various sensors or any controller other than the motor controller 2 (for example, a superior host vehicle controller).

The accelerator position $A_{po}$ is acquired as a detection value of an accelerator position sensor (not shown), or is acquired by the communication with any controller other than the motor controller 2 (for example, the superior host vehicle controller). The direct current voltage value $V_{dc}$ is acquired, for example, as a detection value of a voltage sensor provided on a direct current power supply line of the battery 1, or is acquired by the communication with any controller other than the motor controller 2 (for example, a battery controller).

Next, the motor controller 2 calculates an electric angular velocity $\omega_e$ [rad/s] and a motor rotation speed $\omega_m$ [rad/s] of the drive motor 4, the direct current voltage value $V_{dc}$ [V], and a vehicle speed V [km/h] as in the following (i) to (iii) based on the acquired parameters.

(i) Electric Angular Velocity $\omega_e$

Calculate by time-differentiating the rotor phase α.

(ii) Motor Rotation Speed $\omega_m$ [rad/s]

Calculate by dividing the electric angular velocity $\omega_e$ by the number of pole pairs of the drive motor 4. That is, the motor rotation speed $\omega_m$ corresponds to a mechanical angular velocity of the drive motor 4.

(iii) Vehicle Speed V [km/h]

Calculated by multiplying the motor rotation speed $\omega_m$ by a tire dynamic radius R and multiplying a value obtained by this multiplication by a gear ratio (input rotation speed/output rotation speed) of the reduction gear 5 to calculate a vehicle speed v [m/s]. Further, the vehicle speed V [km/h] is obtained by multiplying the calculated vehicle speed v [m/s] by a unit conversion coefficient (3600/1000).

Figure 3:
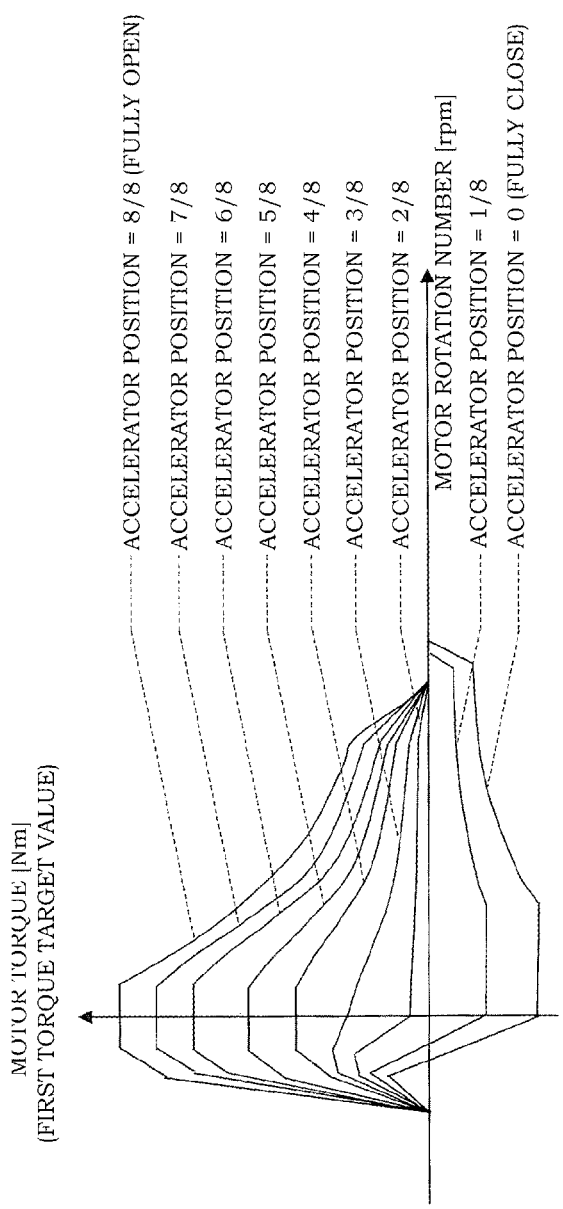
FIG. 3 is a diagram showing an example of an accelerator position (accelerator opening degree)—torque table.

Next, in step S202, the motor controller 2 executes a basis torque target value calculation process. Specifically, the motor controller 2 refers to an accelerator position-torque table illustrated in FIG. 3 and stored in an internal memory in advance, and calculates a first torque target value $T_{m1}^*$ as a basis torque target value based on the accelerator position $A_{po}$ and the motor rotation speed ωm acquired in step S201. That is, the first torque target value $T_{m1}^*$ is a basis target value of a motor torque T determined from a required drive force in accordance with a driver operation or a command of an autonomous driving controller during travelling of the electric vehicle 10.

In step S203, the motor controller 2 executes a stop process. Specifically, the motor controller 2 calculates a stopping basis torque target value (second torque target value $T_{m2}^*$) such that the torque command value $T_m^{**}$ is converged to a disturbance torque estimation value $T_d$ described below in accordance with the decrease of the vehicle speed V (motor rotation speed $\omega_m$). Details of this stop process will be described later.

Further, as described above, the vehicle speed V and the motor rotation speed $\omega_m$ can be regarded as substantially equivalent control parameters (speed parameters) except for a reduction ratio in a power transmission path between the drive motor 4 and the drive wheels 9. Therefore, in a viewpoint of simplifying the description, the following processes focus on an example in which the motor rotation speed $\omega_m$ is employed as a speed parameter. The following description can be similarly applied to a case where the vehicle speed V is set as the speed parameter by taking into account a difference in the reduction ratio described above.

Next, in step S204, the motor controller 2 executes a vibration damping process. Specifically, the motor controller 2 calculates a stopping correction torque target value (filtered torque target value $T_{m\_sf}^*$) obtained by performing filtering on the above second torque target value $T_{m2}^*$.

In a first just-before-stop period in which the vehicle speed V (motor rotation speed $\omega_m$) is within a vehicle speed range equal to or lower than a first vehicle speed threshold value $V_{th1}$ described below (first rotation speed threshold value (atm), the motor controller 2 calculates the torque command value $T_m^{**}$ based on the second torque target value $T_{m2}^*$ calculated in step S203 and the motor rotation speed $\omega_m$ such that a vibration of a torque transmission system (torsional vibration and the like of the drive shaft 8) is suppressed without sacrificing a response of a drive shaft torque.

On the other hand, in a second just-before-stop period set to a vehicle speed range lower than that of the first just-before-stop period described above, the motor controller 2 calculates the torque command value $T_m^{**}$ based on the filtered torque target value $T_{m\_sf}^*$ and the motor rotation speed $\omega_m$ from the similar viewpoint.

Here, the vehicle state control according to the present embodiment includes the stop process of step S203 and the vibration damping process of step S204. The inventors of the present invention have found that when the electric vehicle 10 stops at a specific road surface condition (gentle upward gradient), the stop is performed in a backlash section of a gear, which impairs the control stability, and hunting of the control values lead to the continuous vibration of the vehicle. Such decrease in control stability appears particularly, for example, in a case where a feedforward compensator set at a high gain is included from a viewpoint of suppressing communication and calculation delay during the stop process.

Therefore, a process for suppressing the decrease in the control stability is defined in the vehicle state control according to the present embodiment. Further details of this vehicle state control will be described later.

In step S205, the motor controller 2 executes a current command value calculation process. Specifically, the motor controller 2 calculates dq-axis current target values ($i_d^*$, $i_q^*$) with reference to a table stored in an internal memory or the like in advance, based on the motor rotation speed $\omega_m$ and the direct current voltage value $V_{dc}$ obtained in step S201, and the torque command value $T_m^{**}$ calculated in step S204.

In step S206, the motor controller 2 executes a current control process. Specifically, the motor controller 2 first calculates dq-axis current values ($i_d$, $i_q$) based on the three-phase current detection values ($i_{u\_d}$, $i_{v\_d}$, $i_{w\_d}$) and the rotor phase $\alpha$ acquired in step S201. Next, the motor controller 2 calculates dq-axis voltage command values ($v_d$, $v_q$) from a deviation between the dq-axis current value ($i_d$, $i_q$) and the dq-axis current target values ($i_d^*$, $i_q^*$) obtained in step S205. When calculating the dq-axis voltage command values ($v_d$, $v_q$), well-known non-interference control may be executed as appropriate.

The motor controller 2 further calculates three-phase alternating current voltage command values ($v_u$, $v_v$, $v_w$) based on the dq-axis voltage command values ($v_d$, $v_q$) and the rotor phase $\alpha$. The motor controller 2 subsequently obtains PWM signals ($t_u$, $t_v$, $t_w$) [%] based on the calculated three-phase alternating current voltage command values ($v_u$, $v_v$, $v_w$) and the direct current voltage value Vdc. The PWM signals ($t_u$, $t_v$, $t_w$) obtained in such a manner allow the drive motor 4 to be driven with a desired torque defined by the torque command value $T_m^{}$ by executing an on-off control of the switching elements of the inverter 3**.

Next, details of the stop process in the above step S203 will be described.

<Vehicle State Control>

First, each transfer characteristic based on a model of the drive force transmission system of the vehicle used in the stop process of the present embodiment will be described.

1. Vehicle Response $G_r(s)$

First, in an electric vehicle system 100, a setting of the vehicle response $G_r(s)$ based on a vehicle model obtained by modeling the drive force transmission system of the vehicle will be described. The motor controller 2 applies the vehicle response $G_r(s)$, which is determined in accordance with a calculation algorithm described below, to various processes according to the stop process such as calculation of the disturbance torque estimation value $T_d$, which will be described later, as necessary.

Figure 4:
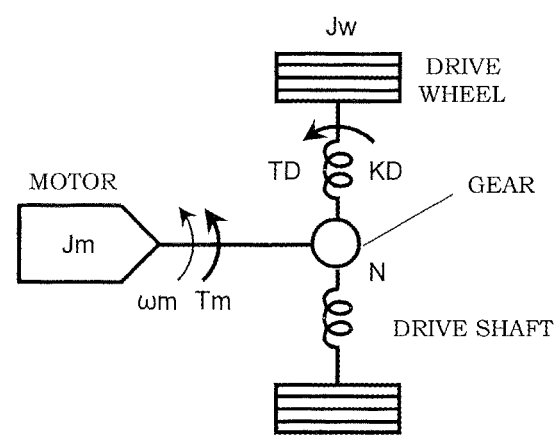
FIG. 4 is a diagram illustrating a dynamic system model of the electric vehicle.
Figure 4:
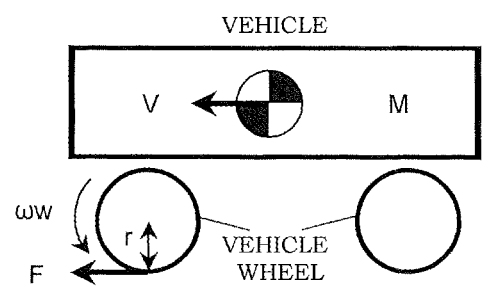

FIG. 4 is a modeled diagram of the drive force transmission system of the electric vehicle 10 of the electric vehicle system 100. Parameters in FIG. 4 are as shown below.

$J_m$: inertia of drive motor 4

$J_w$: inertia of drive wheels 9

M: vehicle weight $K_d$: torsional rigidity of drive system $K_t$: coefficient related to friction between tire and road surface N: overall gear ratio r: tire load radius $\omega_m$: motor rotation speed $T_m$: motor torque (torque command value $T_m^{**}$)

$T_d$: torque of drive wheels 9

F: force applied to vehicle

V: vehicle speed $\omega_w$: angular velocity of drive wheels 9

From FIG. 4, equations of motion of the electric vehicle 10 are expressed by the following Equations (1) to (5).

[Equation 1]
$$J_m \cdot \dot{\omega}_m = T_m - T_d/N \qquad (1)$$

[Equation 2]
$$2J_w \cdot \dot{\omega}_w = T_d - rF \qquad (2)$$

[Equation 3]
$$M \cdot \dot{V} + F \qquad (3)$$

[Equation 4]
$$T_d = K_d \cdot \int \left( \frac{\omega_m}{N} - \omega_w \right) dt \qquad (4)$$

[Equation 5]
$$F = K_t \cdot (r\omega_m - V) \qquad (5)$$

A transfer characteristic $G_p(s)$ from the torque command value $T_m^{**}$ to the motor rotation speed $\omega_m$ is expressed by the following Equation (6) obtained by transforming the Equations (1) to (5) while performing a Laplace transform on these equations.

[Equation 6]
$$G_p(s) = \frac{1}{s} \cdot \frac{b_3 s^3 + b_2 s^2 + b_1 s + b_0}{a_3 s^3 + a_2 s^2 + a_1 s + a_0} \qquad (6)$$

Parameters in Equation (6) are defined by the following Equation (7).

[Equation 7]

$$a_3 = 2J_m \cdot J_w \cdot M \qquad (7)$$
$$a_2 = J_m \cdot (2J_w + Mr^2) \cdot K_t$$
$$a_1 = \left(J_m + \frac{2J_w}{N^2}\right) \cdot M \cdot K_d$$
$$a_0 = \left(J_m + \frac{2J_w}{N^2} + \frac{Mr^2}{N^2}\right) \cdot K_d \cdot K_t$$
$$b_3 = 2J_w \cdot M$$
$$b_2 = (2J_w + Mr^2) \cdot K_t$$
$$b_1 = M \cdot K_d$$
$$b_0 = K_d \cdot K_t$$

In order to check a pole and a zero point of the transfer function shown in Equation (6), the following Equation (8) is obtained by factorizing Equation (6) with respect to a Laplace operator s.

[Equation 8]

$$G_p(s) = \frac{(s+\beta)(b_2's^2 + b_1's + b_0')}{s(s+\alpha)(a_2's^2 + a_1's^1 + a_0')} \qquad (8)$$

In this equation, "α", "β", "a'$_2$", "a'$_1$", "a'$_0$", "b'$_2$", "b'$_1$", and "b'$_0$" are constants determined by the above parameters, which do not depend on the Laplace operator s.

Here, it is known that "α" and "β" in Equation (8) have values extremely close to each other. Therefore, by zero-pole cancellation, that is, by approximating that the zero point (s=−β) and the pole (s=−α) substantially coincide with each other, the transfer characteristic $G_p(s)$ can be expressed as a transfer function of (second order)/(third order) as in the following (9).

[Equation 9]

$$G_p(s) = \frac{(b_2's^2 + b_1's + b_0')}{s(a_2's^2 + a_1's^1 + a_0')} \qquad (9)$$

Further, the transfer characteristic $G_p(s)$ can be rewritten as in the following Equation (10) by applying the respective parameters defined in Equation (7) to the respective coefficients in Equation (9).

[Equation 10]

$$G_p(s) = M_p \cdot \frac{(s^2 + 2\zeta_z \cdot \omega_z \cdot s + \omega_z^2)}{s(s^2 + 2\zeta_p \cdot \omega_p \cdot s + \omega_p^2)} \qquad (10)$$

In Equation (10), "$M_p$" is a constant that does not depend on the Laplace operator s, and "$\zeta_z$", "$\zeta_p$", "$\omega_z$", and "$\omega_p$" are determined as in the following Equation (11).

[Equation 11]

$$\zeta_z = \frac{b_1'}{2(b_0' \cdot b_2')^{\frac{1}{2}}} \qquad (11)$$

$$\omega_z = \left(\frac{b_0'}{b_2'}\right)^{\frac{1}{2}}$$

$$\zeta_p = \frac{b_1'}{2(a_0' \cdot a_2')^{\frac{1}{2}}}$$

$$\omega_p = 2\left(\frac{a_0'}{a_2'}\right)^{\frac{1}{2}}$$

When a vibration damping control algorithm (when $\zeta_p \approx 1$) is applied to the transfer characteristic $G_p(s)$ in Equation (10), the vehicle response $G_r(s)$ can be expressed by the following Equation (12). With respect to the vibration damping control, for example, a well-known method described in JP 2001-45613 A, JP 2002-152916 A, or the like can be used as appropriate.

[Equation 12]

$$G_r(s) = M_p \cdot \frac{(s^2 + 2\zeta_z \cdot \omega_z \cdot s + \omega_z^2)}{s(s^2 + 2\omega_p \cdot s + \omega_p^2)} \qquad (12)$$

2. Details of Vehicle State Control

Figure 5:
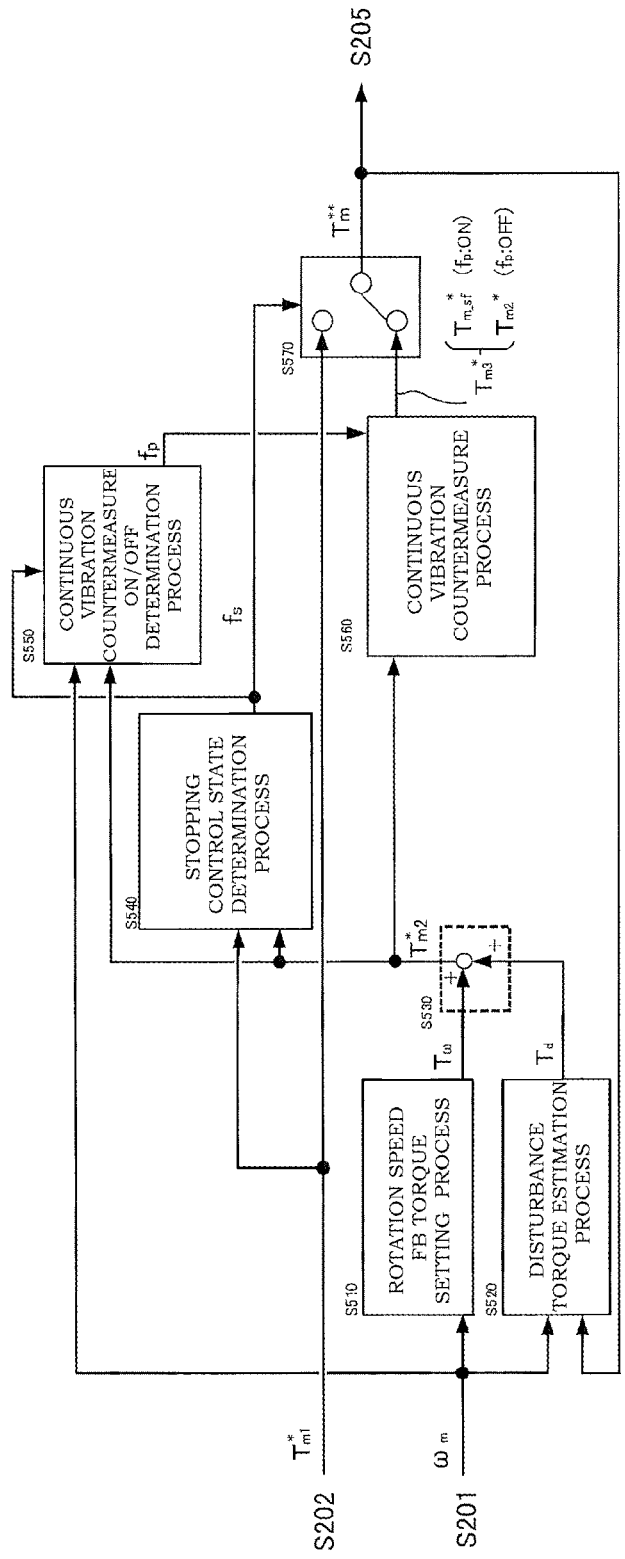
FIG. 5 is a block diagram illustrating each process in vehicle state control.

FIG. 5 is a block diagram illustrating each process in the vehicle state control according to the present embodiment. The vehicle state control according to the present embodiment includes a rotation speed FB torque setting process (step S510), a disturbance torque estimation process (step S520), a second torque target value calculation process (step S530), a stopping process state determination process (step S540), a vibration duration countermeasure ON/OFF determination process (step S550), and a vibration duration countermeasure process (step S560). The motor controller 2 is programmed so as to be able to execute these processes.

First, in step S510, the motor controller 2 calculates a motor rotation speed feedback torque Tω based on the motor rotation speed $\omega_m$. For simplification of the description, in the following description, the motor rotation speed feedback torque Tω is also simply referred to as "FB torque Tω". The FB torque Tω is a feedback value related to the motor torque $T_m$ determined from a viewpoint of stopping the electric vehicle 10 at an appropriate deceleration during the regenerative braking or the like.

Figure 6:
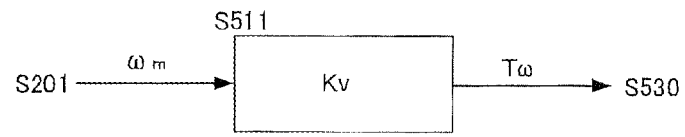
FIG. 6 is a block diagram illustrating a rotation speed FB torque setting process.

FIG. 6 is a block diagram illustrating the rotation speed FB torque setting process. As shown in the figure, the motor controller 2 calculates the FB torque Tω by multiplying the motor rotation speed $\omega_m$ by a predetermined gain $K_v$. The gain $K_v$ is determined to a suitable value (fixed gain or variable gain) from a viewpoint of stopping the electric vehicle 10 through an experiment or the like. In particular, the gain $K_v$ is a negative value required for stopping the electric vehicle just before stop of the vehicle, and is set such that more braking force is obtained (such that an absolute value of the FB torque Tω increases) as the motor rotation speed cam increases.

Instead of the calculation aspect of the FB torque Tω illustrated in FIG. 6, the FB torque Tω may be calculated using a regenerative torque table in which a suitable regenerative torque is determined in accordance with the motor rotation speed $\omega_m$, an attenuation rate table in which an attenuation rate of the motor rotation speed cam is stored in advance, or the like.

Return to FIG. 5, next, in step S520, the motor controller 2 executes the disturbance torque estimation process.

Figure 7:
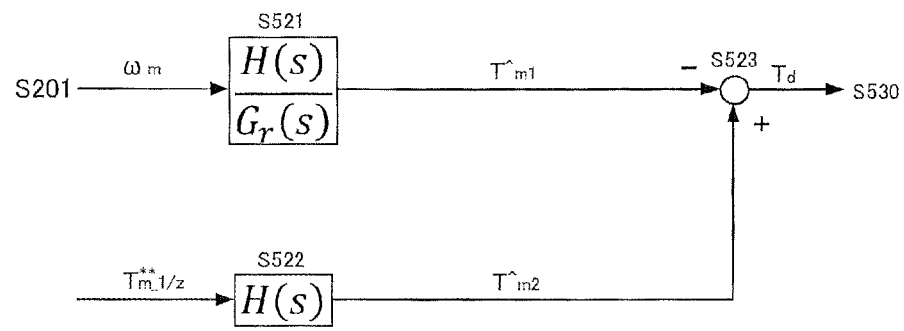
FIG. 7 is a block diagram illustrating a disturbance torque estimation process.

FIG. 7 is a block diagram illustrating the disturbance torque estimation process. As shown in the figure, the disturbance torque estimation process includes a first filter process (step S521), a second filter process (step S522), and a deviation calculation process (step S523).

First, in the first filter process (step S521), the motor controller 2 calculates a first motor torque estimation value $T_{m1}\hat{}$ based on the motor rotation speed $\omega_m$. Specifically, the motor controller 2 calculates the first motor torque estimation value $T_{m1}\hat{}$ by performing filterring on the motor rotation speed $\omega_m$ using a filter $H(s)/G_r(s)$ determined based on a low-pass filter $H(s)$ and the vehicle response $G_r(s)$ in Equation (12).

An order of the low-pass filter $H(s)$ is determined such that an order of the denominator of the filter $H(s)/G_r(s)$ is equal to or higher than an order of the numerator.

Next, in the second filter process (step S522), the motor controller 2 calculates a second motor torque estimation value $T_{m2}\hat{}$ based on a previous value of the torque command value $T_m^{}$ (motor torque previous value $T^{}_{m\_k-1}$). Specifically, the motor controller 2 calculates the second motor torque estimation value $T_{m2}\hat{}$ by performing filterring on the motor torque previous value $T^{**}_{m\_k-1}$ using the low-pass filter $H(s)$.

In the deviation calculation process (step S523), the motor controller 2 calculates a deviation between the first motor torque estimation value $T\hat{}_{m1}$ and second motor torque estimation value $T\hat{}_{m2}$ (that is, "$T\hat{}_{m2}-T\hat{}_{m1}$"), thereby obtaining the disturbance torque estimation value $T_d$.

Instead of or in addition to a calculation logic described in FIG. 7, the disturbance torque estimation value $T_d$ may be calculated from a measurement result by a measuring instrument such as a vehicle longitudinal G sensor.

Here, a disturbance acting on the vehicle may include an air resistance, a modeling error due to a fluctuation in a vehicle mass caused by the number of occupants or a load amount, a rolling resistance of tires, and a road surface disturbance (road surface friction, gradient resistance, and the like), but a disturbance factor assumed in the present embodiment which becomes dominant just before stop of the vehicle is the gradient resistance.

In general, the disturbance factors vary depending on a driving condition of the vehicle. Regarding this, in the disturbance torque estimation process (step S520) of the present embodiment, the disturbance torque estimation value $T_d$ is calculated based on the torque command value $T_m^{**}$, the motor rotation speed $\omega_m$, and the vehicle response $G_r(s)$ derived from the vibration damping control algorithm and the transfer characteristic $G_p(s)$. Therefore, the above various disturbance factors can be estimated collectively. As a result, it is possible to realize a smooth stop from deceleration in various travelling scenes by performing the stop process of the electric vehicle 10 using the disturbance torque estimation value $T_d$ calculated in such a manner.

Return to FIG. 5, the motor controller 2 executes the second torque target value calculation process (step S530) based on the disturbance torque estimation value $T_d$ calculated in step S520 and the FB torque $T\omega$ calculated in step S510.

Specifically, the motor controller 2 calculates the second torque target value $T_{m2}^*$ by adding the disturbance torque estimation value $T_d$ and the FB torque $T\omega$. That is, the second torque target value $T_{m2}^*$ is a torque determined considering the disturbance torque estimation value $T_d$ corresponding to the gradient resistance with respect to the FB torque $T\omega$ set to stop the electric vehicle 10 at an appropriate deceleration as described above, so as to cause the electric vehicle 10 to stop and maintain this state. Therefore, the second torque target value $T_{m2}^*$ is set so as to converge to a positive value on an uphill road ($T_d<0$), a negative value on a downhill road ($T_d>0$), and substantially zero on a flat road ($T_d=0$).

Return to FIG. 5, the motor controller 2 executes the stopping process state determination process (step S540) based on the first torque target value $T_{m1}^*$ calculated in step S202 and the second torque target value $T_{m2}^*$ calculated in step S530.

Figure 8:
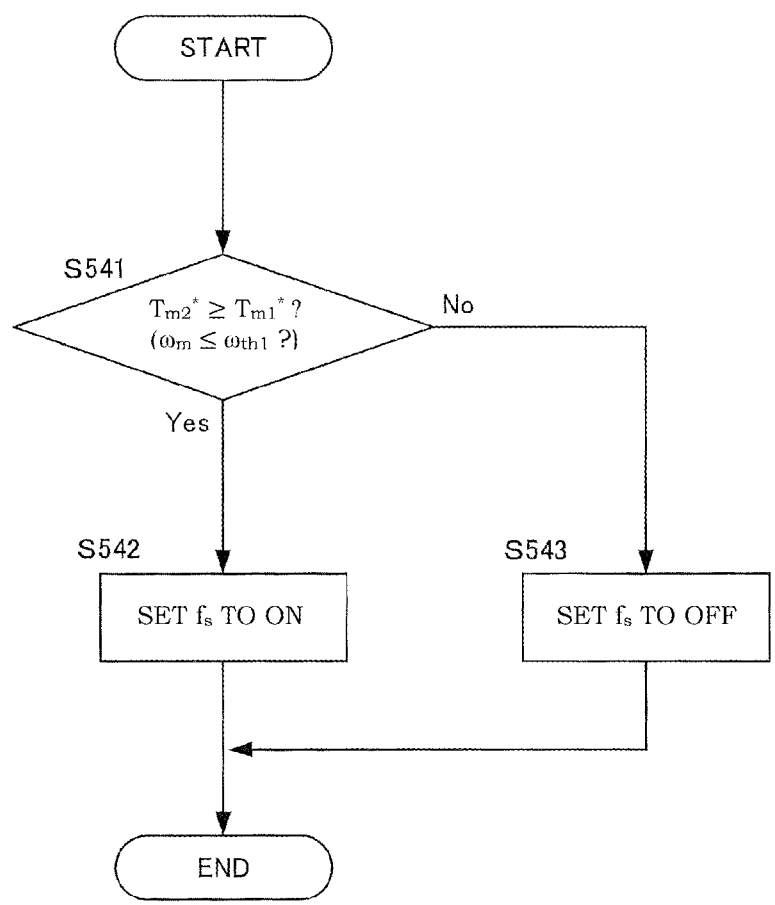
FIG. 8 is a flowchart illustrating a stopping process state determination process.

FIG. 8 is a flowchart illustrating the stopping process state determination process.

First, the motor controller 2 determines a magnitude relation between the first torque target value $T_{m1}^*$ and the second torque target value $T_{m2}^*$ (step S541). Then, the motor controller 2 sets a stopping process state flag $f_s$ to ON (step S542) when determining that the second torque target value $T_{m2}^*$ is equal to or greater than the first torque target value $T_{m1}^*$ (Yes in step S541). Meanwhile, the motor controller 2 sets the stopping process state flag $f_s$ to OFF (step S543) when determining that the second torque target value $T_{m2}^*$ is smaller than the first torque target value $T_{m1}^*$ (No in step S541).

In the present embodiment, the motor rotation speed $\omega_m$ at a timing at which the second torque target value $T_{m2}^*$ is equal to the first torque target value $T_{m1}^*$ is referred to as the "first rotation speed threshold value $\omega_{th1}$". The just-before-stop period of the vehicle of the present embodiment means a vehicle speed range in which the motor rotation speed $\omega_m$ is equal to or lower than the first rotation speed threshold value $\omega_{th1}$. Further, the just-before-stop period of the vehicle includes a first just-before-stop period in a relatively high vehicle speed range and a second just-before-stop period in a relatively low speed range. The first just-before-stop period and the second just-before-stop period will be described later.

Therefore, a case in which the stopping process state flag $f_s$ is set to ON means a case in which the electric vehicle 10 is just before stop of the vehicle.

Return to FIG. 5, the motor controller 2 executes the continuous vibration countermeasure ON/OFF determination process (step S550) based on the motor rotation speed $\omega_m$, the second torque target value $T_{m2}^*$ calculated in step S530, and the stopping process state flag $f_s$ set in step S540.

Figure 9:
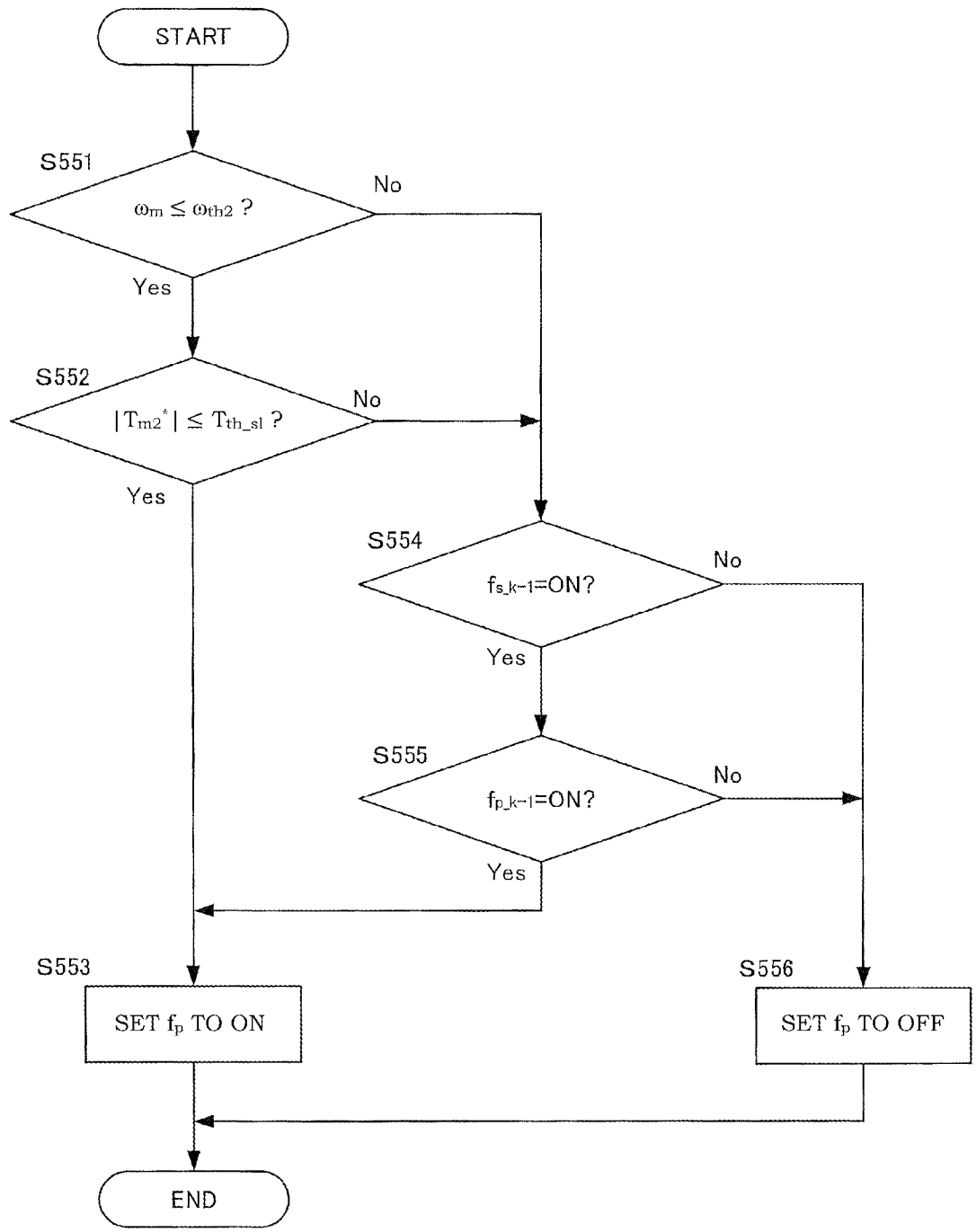
FIG. 9 is a flowchart illustrating a continuous vibration countermeasure ON/OFF determination process.

FIG. 9 is a flowchart illustrating the continuous vibration countermeasure ON/OFF determination process.

First, the motor controller 2 determines a magnitude relation between the motor rotation speed $\omega_m$ and the second rotation speed threshold value $\omega_{th2}$ (step S551).

The second rotation speed threshold value $\omega_{th2}$ is a threshold value of the motor rotation speed $\omega_m$ determined from a viewpoint of determining whether the motor rotation speed $\omega_m$ has decreased from the first rotation speed threshold value $\omega_{th1}$ by a certain amount or more and the electric vehicle 10 has come closer to the just-before-stop period of the vehicle.

In particular, the second rotation speed threshold value $\omega_{th2}$ is set to a suitable value in consideration of a relation with a time constant $\tau_{lpf}$ of a low-pass filter LPF used for obtaining the above filterred torque target value $T_{m\_sf}^*$ from a viewpoint of suppressing the hunting in the control values caused by the electric vehicle 10 stopping in the backlash section of the gear. The second rotation speed threshold value $\omega_{th2}$ is determined based on, for example, a result of an experiment or a simulation.

Then, the motor controller 2 proceeds to determination in step S552 when determining that the motor rotation speed $\omega_m$ is equal to or lower than the second rotation speed threshold value $\omega_{th2}$ (Yes in step S551). In contrast, the motor controller 2 proceeds to determination in step S554 when determining that the motor rotation speed $\omega_m$ exceeds the second rotation speed threshold value $\omega_{th2}$ (No in step S551).

The first just-before-stop period in the present embodiment is defined as a case in which a determination result of step S541 in FIG. 8 is Yes and a determination result of step S551 in FIG. 9 is No. That is, the first just-before-stop period is defined as a case in which the motor rotation speed $\omega_m$ is equal to or lower than the first rotation speed threshold value $\omega_{th1}$ and exceeds the second rotation speed threshold value $\omega_{th2}$. The second just-before-stop period is defined as a case in which both the determination results of step S541 and step S551 are Yes. That is, the second just-before-stop period is defined as a case in which the motor rotation speed $\omega_m$ is equal to or lower than the second rotation speed threshold value $\omega_{th2}$ (in particular, a case of exceeding zero and being equal to or lower than the second rotation speed threshold value $\omega_{th2}$).

Therefore, a case in which the determination result of step S551 is No corresponds to the first just-before-stop period, and a case in which the determination result of step S551 is Yes corresponds to the second just-before-stop period.

Then, the motor controller 2 determines a magnitude relation between an absolute value of the second torque target value $T_{m2}^*$ (hereinafter, also simply referred to as "torque absolute value $|T_{m2}^*|$") and a torque threshold value $T_{th\_sl}$ (step S552). The "torque threshold value $T_{th\_sl}$" is determined based on a result of an experiment or a simulation from a viewpoint of determining whether a road gradient is gentle enough to cause the hunting of the control values caused by the stop in the backlash section of the gear.

That is, as described above, the second torque target value $T_{m2}^*$ is calculated as a sum of the disturbance torque estimation value $T_d$ corresponding to the gradient resistance and the FB torque $T\omega$. Therefore, the absolute value of the second torque target value $T_{m2}^*$ relates to a magnitude of the gradient resistance. Therefore, in the present embodiment, a configuration is adopted in which it is estimated whether the road surface gradient is a gentle gradient which is a problem, by referring to the magnitude relation between the second torque target value $T_{m2}^*$ and the torque threshold value $T_{th\_sl}$. Instead of determining the gentle gradient based on the second torque target value $T_{m2}^*$, the gentle gradient may be determined based on the disturbance torque estimation value $T_d$. This determination may be executed based on detection values of various sensors for detecting the road gradient.

Then, the motor controller 2 sets a continuous vibration countermeasure flag $f_p$ to ON (step S553) when determining that the torque absolute value $|T_{m2}^*|$ is equal to or lower than the torque threshold value $T_{th\_sl}$ (Yes in step S552). That is, in the present embodiment, when the vehicle is in the second just-before-stop period and the travelling road surface is the gentle gradient, the continuous vibration countermeasure flag $f_p$ is set to ON.

In contrast, the motor controller 2 proceeds to the determination of step S554 when determining that the motor rotation speed $\omega_m$ exceeds the rotation speed $\omega_m$ (No in step S551) or the torque absolute value $|T_{m2}^*|$ exceeds the torque threshold value $T_{th\_sl}$ (No in step S552).

Then, the motor controller 2 determines whether the stopping process state flag $f_s$ at a calculation timing before one control cycle (hereinafter, also referred to as "previous stopping process state flag $f_{s\_k-1}$") is ON (step S554) and determines whether the continuous vibration countermeasure flag $f_p$ at a calculation timing before one control cycle (hereinafter, also referred to as "previous continuous vibration countermeasure flag $f_{p\_k-1}$") is ON (step S555).

Then, the motor controller 2 sets the continuous vibration countermeasure flag $f_p$ to ON (step S553) when determining that both the previous stopping process state flag $f_{s\_k-1}$ and the continuous vibration countermeasure flag $f_{p\_k-1}$ are ON (both step S554 and step S55 are Yes).

In contrast, the motor controller 2 sets the continuous vibration countermeasure flag $f_p$ to OFF (step S556) when determining that at least one of the previous stopping process state flag $f_{s\_k-1}$ and the continuous vibration countermeasure flag $f_{p\_k-1}$ is OFF (step S554 or step S555 is No).

As a result, when the continuous vibration countermeasure flag $f_p$ is set to ON, a state in which the continuous vibration countermeasure flag $f_p$ is maintained to be ON continues until the stopping process state flag $f_s$ is set to OFF.

Return to FIG. 5, the motor controller 2 executes a continuous vibration countermeasure process (step S560) based on the second torque target value $T_{m2}^*$ calculated in step S530 and the continuous vibration countermeasure flag $f_p$ set in step S550, thereby calculating a third torque target value $T_{m3}^*$.

Figure 10:
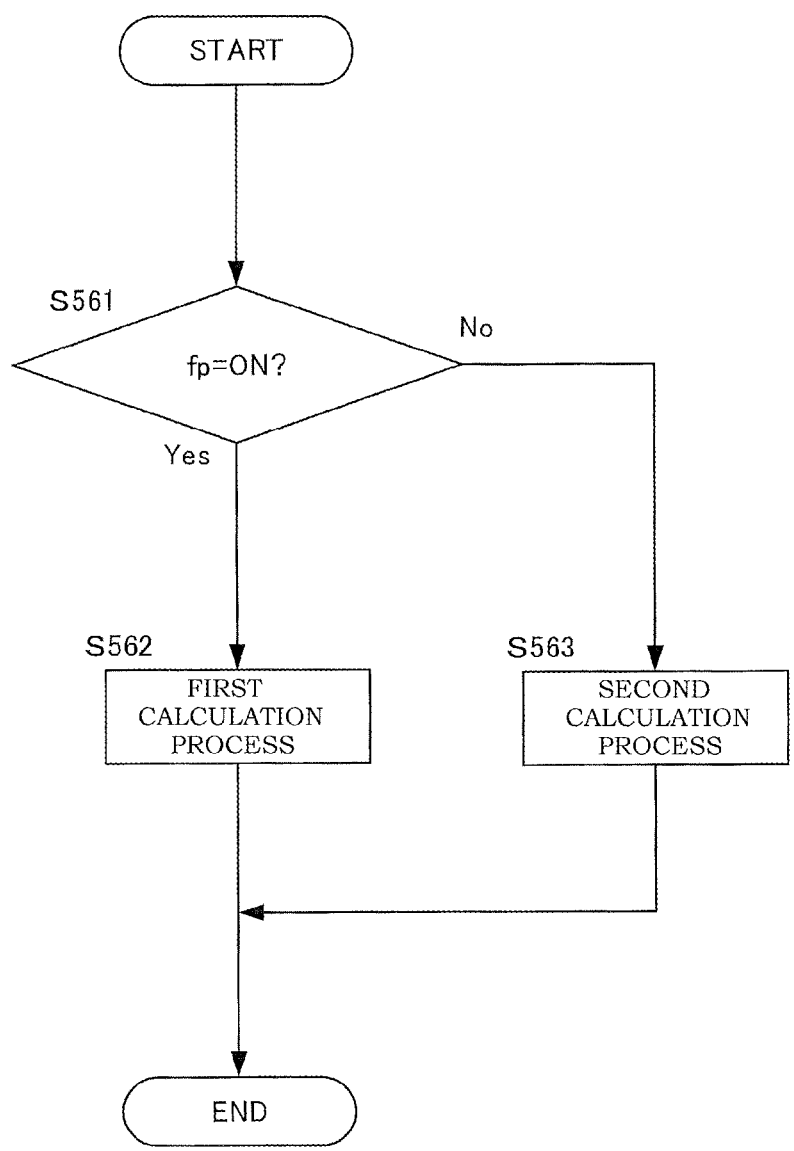
FIG. 10 is a flowchart illustrating a continuous vibration countermeasure process.

FIG. 10 is a flowchart illustrating the continuous vibration countermeasure process.

First, the motor controller 2 determines whether the continuous vibration countermeasure flag $f_p$ is set to ON (step S561). Then, the motor controller 2 executes a first calculation process of calculating the third torque target value $T_{m3}^*$ by a first calculation method (step S562) when determining that the continuous vibration countermeasure flag $f_p$ is set to ON (Yes in step S561).

In contrast, the motor controller 2 executes a second calculation process of calculating the third torque target value $T_{m3}^*$ by a second calculation method (step S563) when determining that the continuous vibration countermeasure flag $f_p$ is set to OFF (No in step S561). Hereinafter, details of the first calculation process and the second calculation process will be described.

[First Calculation Process]

The motor controller 2 calculates, as the third torque target value $T_{m3}^*$, the filtered torque target value $T_{m\_sf}^*$ obtained by performing filterring on the second torque target value $T_{m2}^*$ by the low-pass filter LPF. Specifically, the motor controller 2 calculates the third torque target value $T_{m3}^*$ based on the following Equation (13).

[Equation 13]

$$T_{m3}^*[k] = \frac{s_{lpf} + s_{lpf} \cdot z^{-1}}{1 + 2(s_{lpf} - 1)} \cdot T_{m2}^*[k] \qquad (13)$$

A transfer function on the right side of Equation (13) is an approximate representation of the low-pass filter LPF using a discrete variable "z" in accordance with the control cycle. In Equation (13), [k] is a symbol indicating that the control value is determined at a kth (k=1, 2, . . . ) calculation timing. In Equation (13), "$s_{lpf}$" is defined by the following Equation (14).

[Equation 14]

$$S_{lpf} = \frac{T_{smp}}{T_{smp} + 2\tau_{lpf}} \quad (14)$$

In Equation (14), "$T_{smp}$" represents a set calculation timing, and "$\tau_{lpf}$" represents the time constant.

The time constant $\tau_{lpf}$ is set to a suitable value from a viewpoint of ensuring the control stability in the backlash section of the gear in the electric vehicle 19. In particular, the time constant $\tau_{lpf}$ is determined by referring to a result of a sensory evaluation test in an actual vehicle, and is stored in advance in an internal memory or the like of the motor controller 2.

That is, when the continuous vibration countermeasure flag $f_p$ is set to ON, the third torque target value $T_{m3}*$ is determined as the filtered torque target value $T_{m\_sf}*$ obtained by performing filterring on the second torque target value $T_{m2}*$ with the low-pass filter LPF having the time constant $\tau_{lpf}$.

[Second Calculation Process]

The motor controller 2 basically calculates the third torque target value $T_{m3}*$ from the second torque target value $T_{m2}*$ so as to satisfy both the above Equation (13) and the following Equation (15).

[Equation 15]

$$T_{m3}^*[k-1] = T_{m2}^*[k-1] = T_{m2}^*[k] \quad (15)$$

As understood by replacing [k] in Equation (15) with [k+1], the third torque target value $T_{m3}*[k]$ of the k-th calculation timing is set to a value the same as the second torque target value $T_{m2}*[k]$ of the k-th calculation timing as an input.

Therefore, when the continuous vibration countermeasure flag $f_p$ is set to OFF, the motor controller 2 substantially calculates the second torque target value $T_{m2}*$ as the third torque target value $T_{m3}*$.

Further, according to the calculation logic defined by the above Equation (15), both the second torque target value $T_{m2}*[k-1]$ as an input value at a previous (k-1)st calculation timing and the third torque target value $T_{m3}*[k-1]$ as the output value at the previous (k-1)st calculation timing are set to a value the same as the second torque target value $T_{m2}*[k]$ of the kth calculation timing. That is, in an initial calculation timing after the continuous vibration countermeasure flag $f_p$ is switched from OFF to ON, previous input and output values of the low-pass filter LPF are initialized to the second torque target value $T_{m2}*[k]$. That is, the third torque target value $T_{m3}*[k]$ at a timing when the continuous vibration countermeasure flag $f_p$ is switched from OFF to ON is calculated by performing filterring on the second torque target value $T_{m2}*[k]$ equal to both the second torque target value $T_{m2}*[k-1]$ as the input value at the previous calculation timing and the third torque target value $T_{m3}*$ [K-1] as the output value at the previous calculation timing. Therefore, it is possible to suppress a sudden change in the final torque command value $T_m**$ when the continuous vibration countermeasure flag $f_p$ is switched from OFF to ON, thereby suppressing an occurrence of a torque discontinuity.

Return to FIG. 5, the motor controller 2 executes a torque command value calculation process (step S570) based on the first torque target value $T_{m1}*$ calculated in step S202, the stopping process state flag $f_s$ set in step S560, and the third torque target value $T_{m3}*$ calculated in step S560.

Figure 11:
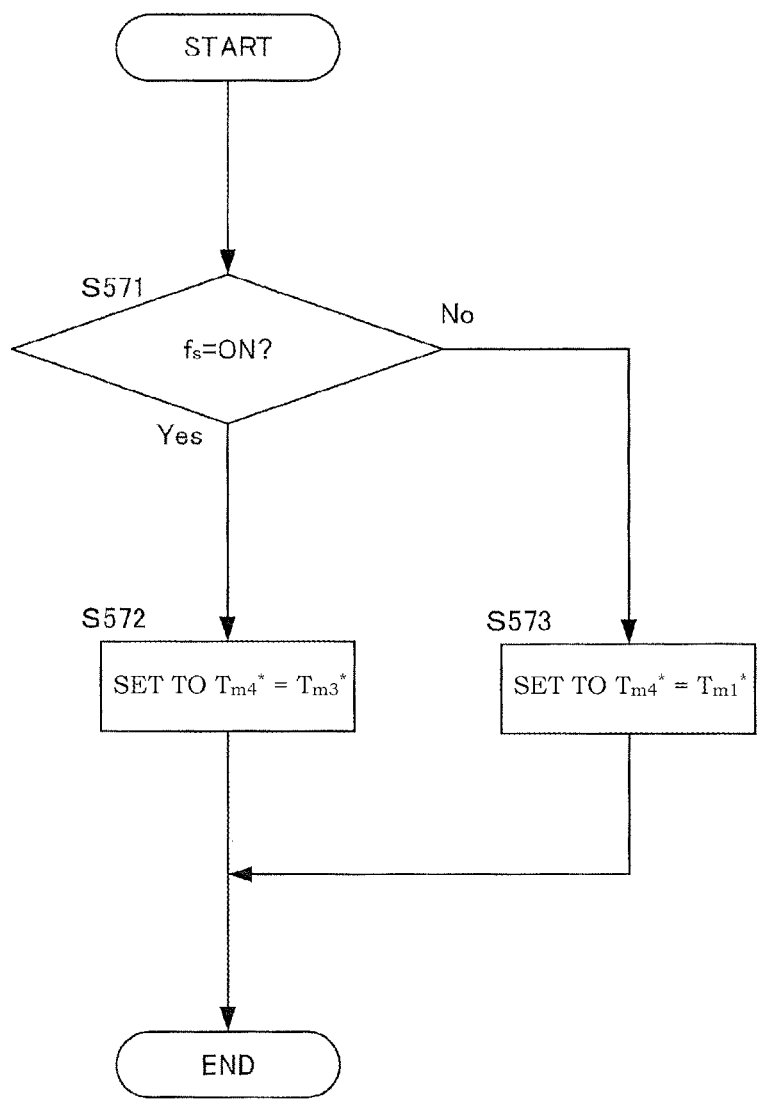
FIG. 11 is a flowchart illustrating a torque command value calculation process.

FIG. 11 is a flowchart illustrating the torque command value calculation process.

As shown in the figure, the motor controller 2 determines whether the stopping process state flag $f_s$ is set to ON (step S571). Then, the motor controller 2 sets the third torque target value $T_{m3}*$ to the torque command value $T_m**$ while applying the above-described process of vibrating the torque transmission system (step S572) when determining that the stopping process state flag $f_s$ is set to ON (Yes in step S571).

In contrast, the motor controller 2 sets the first torque target value $T_{m1}*$ to the torque command value $T_m**$ while applying the above-described process of vibrating the torque transmission system (step S573) when determining that the stopping process state flag $f_s$ is set to OFF (No in step S571).

Then, the motor controller 2 executes processes of step S205 and subsequent steps of FIG. 2 based on the calculated torque command value $T_m**$.

According to the above-described stop process, the filterred torque target value $T_{m\_sf}*$ obtained by performing filterring on the second torque target value $T_{m2}*$ to the torque command value $T_m**$ is set at a timing at which the second just-before-stop period in a lower speed range than the first just-before-stop period. Therefore, it is possible to realize a stop mode capable of smoothly decelerating the electric vehicle 10 with a suitable deceleration profile in a former half of a stop scene, while suppressing the vibration caused by the stop in the backlash section of the gear in a latter half of the stop scene.

Next, a control result by the electric vehicle control method of the present embodiment will be described in comparison with a comparative example.

Figure 12:
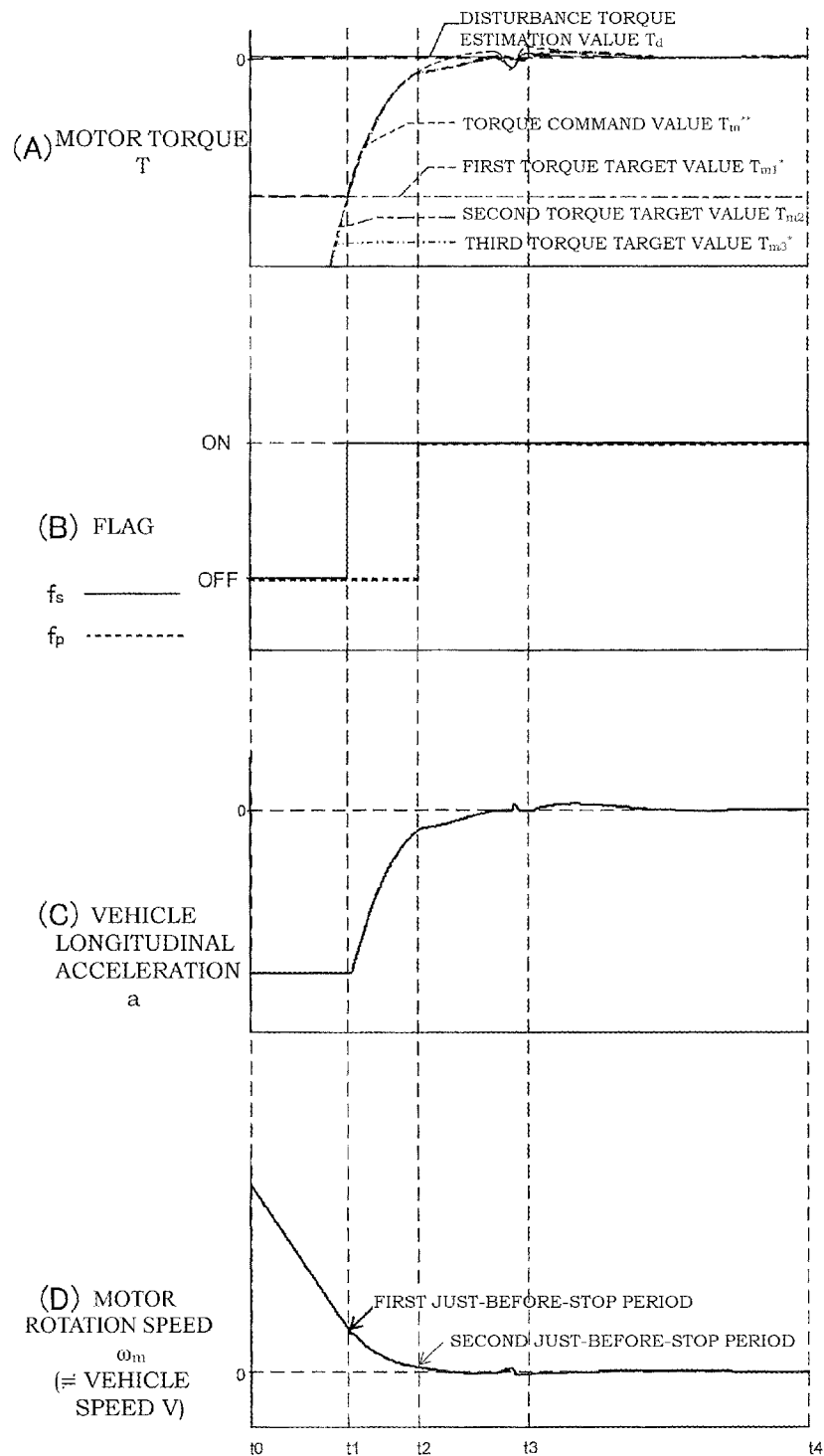
FIG. 12 is a timing chart illustrating a control result of an example.
Figure 13:
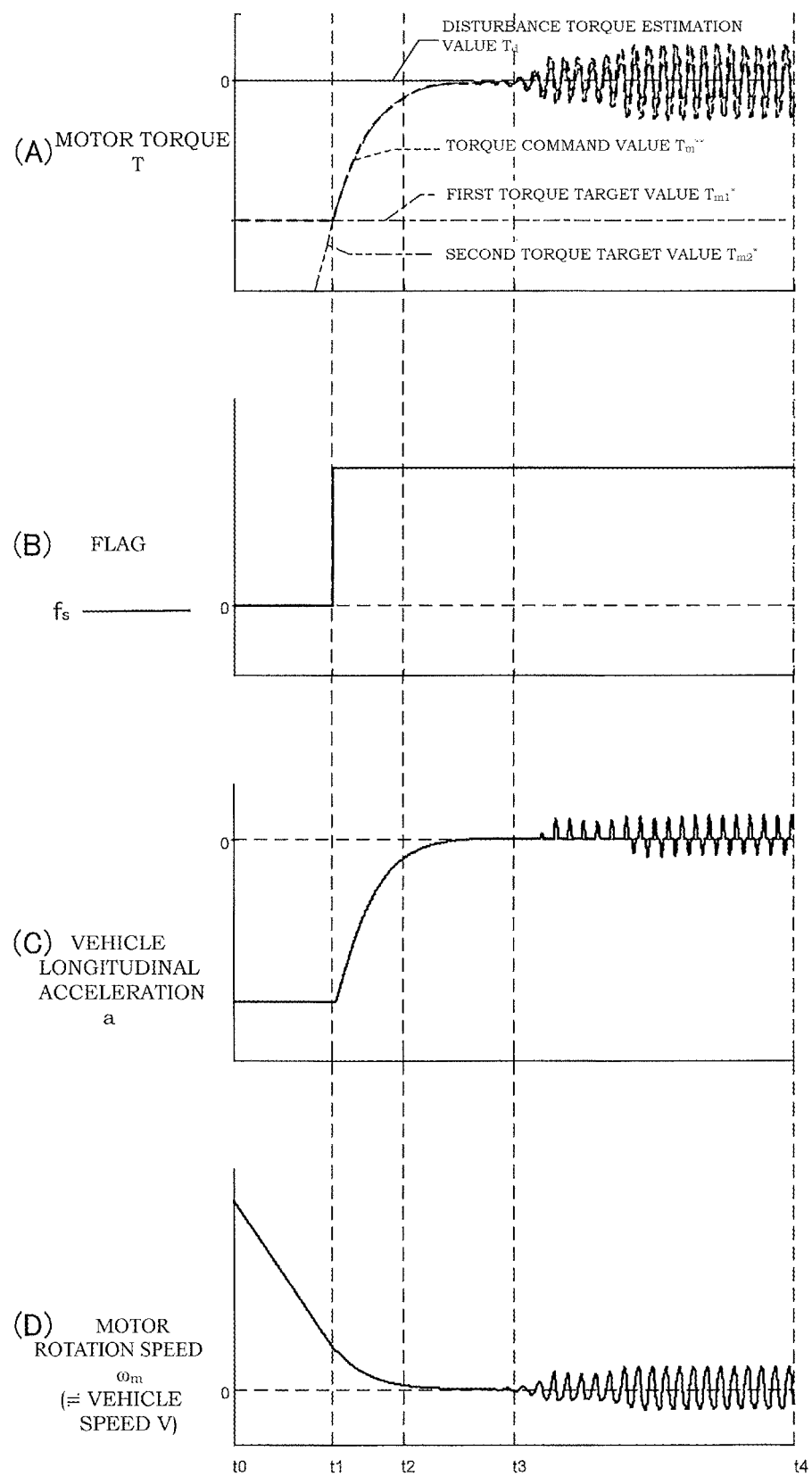
FIG. 13 is a timing chart illustrating a control result according to an example in the related art.

FIG. 12 is a timing chart illustrating a simulation result when the electric vehicle control method according to the present embodiment is executed. FIG. 13 is a timing chart illustrating a simulation result when an electric vehicle control method according to the comparative example is executed. In particular, both FIG. 12 and FIG. 13 show control results in a scene in which the electric vehicle 10 is travelling on a gentle upward gradient.

More specifically, FIG. 12(A) to FIG. 12(D) show a change with time of the motor torque $T_m$, the ON/OFF state of each flag (the stopping process state flag $f_s$ and the continuous vibration countermeasure flag $f_p$), an acceleration a in a longitudinal direction of the electric vehicle 10, and the motor rotation speed $\omega_m$, respectively. FIG. 13(A) to FIG. 13(D) also show a change with time in the same parameters as in FIG. 12(A) to FIG. 12(D) except that a change with time in the ON/OFF state of the stopping process state flag L is shown in FIG. 13(B) alone.

In the timing charts of FIG. 12 and FIG. 13, the motor torque $T_m$, the acceleration a, and the motor rotation speed $\omega_m$ all have an advance direction of the electric vehicle 10 as a positive direction.

Comparative Example

1. Simulation Condition

A simulation was performed with respect to a control method of executing the current command value calculation process (step S205) based on the second torque target value $T_{m2}*$ when the stopping process state flag $f_s$ is ON and executing the current command value calculation process (step S205) based on the first torque target value $T_{m1}*$ when the stopping process state flag $f_s$ is OFF, without executing the vibration duration countermeasure ON/OFF determination process (step S550) and the vibration duration countermeasure process (step S560) of FIG. 5. In particular, in the present simulation, the control values were observed under a condition that the electric vehicle 10 stops on a gentle upward gradient.

2. Result

In the control method of the comparative example, during a period from a time t0 to a time t1, while the stopping process state flag $f_s$ was kept OFF, the electric vehicle 10 was decelerated (the motor rotation speed $\omega_m$ decreased) by the torque command value $T_m^{**}$ based on the first torque target value $T_{m1}^*$.

At the time t1 at which the stopping process state flag $f_s$ was switched from OFF to ON (first just-before-stop period), the torque command value $T_m^{**}$ was switched from the first torque target value $T_{m1}^*$ to the second torque target value $T_{m2}^*$. Then, in a period from the time t1 to a time t3, the electric vehicle 10 was decelerated by the torque command value $T_m^{**}$ based on the second torque target value $T_{m2}^*$. In this period, the torque command value $T_m^{**}$ changed so as to converge to the disturbance torque estimation value $T_d$, and the motor rotation speed win changed so as to converge to zero.

Further, at the time t3 (stop timing), the torque command value $T_m^{**}$ and the motor rotation speed $\omega_m$ substantially converged to the disturbance torque estimation value $T_d$ and zero, respectively. On the other hand, the control values vibrated continuously even after the time t3 at which the control values should have converged.

3. Consideration

It has been found that in the stop scene at a gentle upward gradient, the control stability decreased due to the disturbance torque estimation value $T_d$ at the stop timing (time t3) being included in the backlash section of the gear, which leads to the vibration.

Example

1. Simulation Condition

With respect to the control method of configurations described in the present embodiment, a simulation was executed under a condition that the electric vehicle 10 reaches a gentle upward gradient as in the comparative example, and the control values were observed.

2. Result

From the time t0 to the time t1 (first just-before-stop period) and from the time t1 (first just-before-stop period) to the time t2 (second just-before-stop period), the control values showed the same behavior as the comparative example. In contrast, different from that of the comparative example, the torque command value $T_m^{**}$ in the time t2 (second just-before-stop period) to the time t3 (stop timing) was set to the filtered torque target value $T_{m\_sf}^*$. In the example, no continuous vibration of the control values was observed after the time t3 as occurred in the case of the comparative example.

3. Consideration

In the control method of the embodiment, it is considered that by switching the continuous vibration counter measure flag $f_p$ from OFF to ON at the time t2 (second just-before-stop period), the torque command value $T_m^{**}$ was switched to the filtered filtered torque target value $T_{m\_sf}^*$ from the second torque target value $T_{m2}^*$ in accordance with a control logic according to the continuous vibration countermeasure process described in FIG. 10. As a result, the continuous vibration of the control values as occurs during the stop in the backlash section of the gear was suppressed.

Configurations and effects of the electric vehicle control method of the present embodiment described above will be described collectively.

The present embodiment provides an electric vehicle control method for controlling a motor (drive motor 4) based on the torque command value $T_m^{**}$ in the electric vehicle 10 equipped with the drive motor 4 as a travelling drive source.

The electric vehicle control method includes: the disturbance torque estimation process of calculating the disturbance torque estimation value $T_d$ as the disturbance torque estimation value including an influence of the road surface gradient (step S520); a speed parameter acquisition process of acquiring the speed parameter relating to the rotation speed of the drive motor 4 or the vehicle speed V (motor rotation speed $\omega_m$ or speed V) (step S201); and the vehicle state control (FIG. 5) including the stop process of calculating the second torque target value $T_{m2}^*$ as the stopping basis torque target value so as to converge the torque command value $T_m^{**}$ to the disturbance torque estimation value $T_d$ in accordance with a decrease of the motor rotation speed $\omega_m$ (step S203 and step S530), and the vibration damping process of calculating the stopping correction torque target value (filtered torque target value $T_{m\_sf}^*$) by performing filtering on the second torque target value $T_{m2}^*$ (step S204 and step S560).

In the vibration damping process, in the first just-before-stop period set in a relatively high vehicle speed range ($\omega_{th2} < \omega_m \leq \omega_{th1}$), the torque command value $T_m^{**}$ is set based on the second torque target value $T_{m2}^*$. In the second just-before-stop period set in a relatively low vehicle speed range ($\omega_m \leq \omega_{th2}$), the torque command value $T_m^{**}$ is set based on the filtered torque target value $T_{m\_sf}^*$ (step S570).

As a result, in the former half (first just-before-stop period) of the stop scene of the electric vehicle 10, the electric vehicle 10 is smoothly decelerated in accordance with characteristics of the second torque target value $T_{m2}^*$ suitable for deceleration during stopping, while in the latter half (second just-before-stop period) of the stop scene of the electric vehicle 10, the drive motor 4 can be operated so as to suppress the continuous vibration in accordance with characteristics of the filtered torque target value $T_{m\_sf}^*$.

In particular, by setting the filtered torque target value $T_{m\_sf}^*$ as the torque command value $T_m^{**}$, it is possible to suppress the vibrations in the control values caused by the stop in the backlash section of the gear of the electric vehicle 10 to further improve the control stability.

The electric vehicle control method of the present embodiment further includes the basis torque target value calculation process (step S202) for calculating the basis torque target value (first torque target value $T_{m1}^*$) based on the required drive force (accelerator position $A_{po}$) for the electric vehicle 10.

The first just-before-stop period is set as a vehicle speed range equal to or lower than the first vehicle speed threshold value (first rotation speed threshold value $\omega_{th1}$) at which the second torque target value $T_{m2}^*$ is equal to the first torque target value $T_{m1}^*$, and exceeding the second vehicle speed threshold value $V_{th2}$ (second rotation speed threshold value $\omega_{th2}$) lower than the first vehicle speed threshold value (Yes in step S541 and No in step S551).

The second just-before-stop period is set as a vehicle speed range equal to or lower than the second vehicle speed threshold value (second rotation speed threshold value $\omega_{th2}$) (Yes in step S551).

As a result, a concrete control logic is realized for limiting the second just-before-stop period, which is a scene where the filtered torque target value $T_{m\_sf}^*$ is set as the torque command value $T_m^{}$, to a section where the above-mentioned decrease in the control stability may occur. Therefore, in the stop scene, a more suitable switching timing of the torque command value $T_m^{}$ between the second torque target value $T_{m2}^*$ suitable for the deceleration and the filtered torque target value $T_{m\_sf}^*$ suitable for ensuring the decrease in the control stability is realized.

For example, before a timing assumed from a viewpoint of suppressing the decrease in the control stability caused by the stop in the backlash section of the gear, occurrence of unintended control results such as response delay caused by switching the torque command value $T_m^{**}$ from the second torque target value $T_{m2}^*$ to the filtered torque target value $T_{m\_sf}^*$ is suppressed.

In particular, in the vibration damping process, at the initial calculation timing (kth calculation timing) after the transition from the first just-before-stop period to the second just-before-stop period, the previous value of the input value and the previous value of the output value (the second torque target value $T_{m2}^*[k-1]$ and the third torque target value $T_{m3}^*[k-1]$) during the filtering (a process by the low-pass filter LPF) for calculating the stopping basis torque target value (third torque target value $T_{m3}^*$) are initialized by the second torque target value $T_{m2}^*$ calculated at the kth calculation timing (Equation (15)).

As a result, with the transition from the first just-before-stop period to the second just-before-stop period, the torque discontinuity generated when the torque command value $T_m^{**}$ is switched can be suppressed more preferably.

Further, in the vibration damping process of the present embodiment, when the torque command value $T_m^{**}$ is set based on the filtered torque target value $T_{m\_sf}^*$, this setting is maintained until the second torque target value $T_{m2}^*$ becomes the first torque target value $T_{m1}^*$ (step S555).

As a result, the hunting of the torque command value $T_m^{**}$ due to frequent switching between the second torque target value $T_{m2}^*$ and the filtered torque target value $T_{m\_sf}^*$ is suppressed.

The present embodiment also provides an electric vehicle control method of another aspect for controlling a motor (drive motor 4) based on the torque command value $T_m^{**}$ in the electric vehicle 10 equipped with the drive motor 4 as the travelling drive source.

The electric vehicle control method includes: the disturbance torque estimation process of calculating the disturbance torque estimation value $T_d$ as the disturbance torque estimation value including an influence of the road surface gradient (step S520); the speed parameter acquisition process of acquiring the speed parameter relating to the rotation speed of the drive motor 4 or the vehicle speed V (motor rotation speed $\omega_m$ or vehicle speed V) (step S201); and the vehicle state control including the stop process of calculating the second torque target value $T_{m2}^*$ as the stopping basis torque target value so as to converge the torque command value $T_m^{**}$ to the disturbance torque estimation value $T_d$ in accordance with a decrease of the motor rotation speed $\omega_m$ (step S203 and step S530), and the vibration damping process of calculating the stopping correction torque target value (filtered torque target value $T_{m\_sf}^*$) by performing filtering on the second torque target value $T_{m2}^*$ (step S204 and step S560).

In the vibration damping process, when an absolute value of the road surface gradient exceeds a predetermined value, the torque command value $T_m^{**}$ is set based on the second torque target value $T_{m2}^*$ (No in step S552, step S556, and step S570). When the absolute value of the road gradient is equal to or lower than the predetermined value, the torque command value $T_m^{**}$ is set based on the filtered torque target value $T_{m\_sf}^*$ (Yes in step S552 and step S553).

As a result, a smooth deceleration mode can be realized by maintaining the second torque target value $T_{m2}^*$ suitable for the deceleration during the stopping when the electric vehicle 10 is stopped on a road surface gradient where the control stability is unlikely to decrease due to the stop in the backlash section of the gear (steep road surface gradient), while the control stability can be further improved by setting the filtered torque target value $T_{m\_sf}^*$ when the electric vehicle 10 is stopped on a gentle road surface gradient on which the control stability may decrease.

Therefore, a scene in which the torque command value $T_m^{**}$ is set to the filtered filterred torque target value $T_{m\_sf}^*$ can be limited to a stop scene on a gentle upward gradient where the control stability may decrease more reliably. For this reason, the vibration of the control values caused by the stopping in the backlash section of the gear is suitably suppressed on a gentle upward gradient, and the continuous vibration during the stopping of the electric vehicle 10 is prevented from occurring.

In the vibration damping process of the present embodiment, a determination of whether the absolute value of the road surface gradient is equal to or lower than the predetermined value is executed based on whether the absolute value of the second torque target value $T_{m2}^*$ ($|T_{m2}^*|$) is equal to or lower than a predetermined torque threshold value $T_{th\_sl}$ (step S552).

This realizes a concrete control logic for estimating a magnitude of the road surface gradient for which the filterred torque target value $T_{m\_sf}^*$ should be set to the torque command value $T_m^{}$. Therefore, when stopping on a gentle upward gradient on which the control values may vibrate, a control logic is provided to realize a more suitable switching of the torque command value $T_m^{}$ between the second torque target value $T_{m2}^*$ suitable for the deceleration and the filterred torque target value $T_{m\_sf}^*$ suitable for ensuring the decrease in the control stability.

The present embodiment further provides an electric vehicle control device (motor controller 2) that controls a motor (drive motor 4) based on the torque command value $T_m^{**}$ in the electric vehicle 10 equipped with the drive motor 4 as the travelling drive source.

This motor controller 2 includes: a disturbance torque estimation unit that calculates the disturbance torque estimation value $T_d$ as a disturbance torque estimation value including an influence of the road surface gradient (step S520); a speed parameter acquisition unit that acquires the speed parameter relating to the rotation speed of the drive motor 4 or the vehicle speed V (motor rotation speed $\omega_m$ or vehicle speed V) (step S201); and a vehicle state control unit (FIG. 5) including the stop process of calculating the second torque target value $T_{m2}^*$ as the stopping basis torque target value so as to converge the torque command value $T_m^{**}$ to the disturbance torque estimation value $T_d$ in accordance with the decrease in the motor rotation speed $\omega_m$ (step S203 and step S530), and the vibration damping process of calculating the stopping correction torque target value (filterred torque target value $T_{m\_sf}^*$) by performing filtering on the second torque target value $T_{m2}^*$ (step S204 and step S560).

As the vibration damping process, the vehicle state control unit of the motor controller 2 sets the torque command value $T_m^{**}$ based on the second torque target value $T_{m2}^*$ in the first just-before-stop period set in a relatively high vehicle speed range ($\omega_{th2} < \omega_m \leq \omega_{th1}$). In the second just-before-stop period set in a relatively low vehicle speed range ($\omega_m \leq \omega_{th2}$), the torque command value $T_m^{**}$ is set based on the filtered torque target value $T_{m\_sf}^*$ (step S570).

As a result, an electric vehicle control device having a configuration (in particular, a program configuration) suitable for executing the electric vehicle control method is realized as the motor controller 2.

Although the embodiments of the present invention have been described above, configurations described in the above-mentioned embodiments and each modification are only a part of application examples of the invention, and are not meant to limit the technical scope of the invention.

For example, in the above-described embodiments, at least a part of the processes executed by the motor controller 2 (step S201 to step S206 in FIG. 2) may be distributed to other controllers (such as the superior host vehicle control controller) mounted on the electric vehicle 10. In particular, when this configuration is adopted, a suitable communication protocol such as a controller area network (CAN) can be adopted for communication of necessary signals between the motor controller 2 and other controllers.

In the above-described embodiments, an example of performing filtering in the continuous vibration countermeasure (step S560) on the second torque target value $T_{m2}^*$ has been described. However, this filtering may be executed with respect to the torque target value output from the torque command value calculation process (step S570).

The invention claimed is:

1. An electric vehicle control method for controlling a motor based on a torque command value in an electric vehicle equipped with the motor as a travelling drive source, the electric vehicle control method comprising:
    a disturbance torque estimation process of calculating a disturbance torque estimation value including an influence of a road surface gradient;
    a speed parameter acquisition process of acquiring a speed parameter relating to a vehicle speed; and
    a vehicle state control including a stop process of calculating a stopping basis torque target value so as to converge the torque command value to the disturbance torque estimation value in accordance with a decrease in the speed parameter, and a vibration damping process of calculating a stopping correction torque target value by performing filtering on the stopping basis torque target value, wherein
    in the vehicle state control,
        the torque command value is set based on the stopping basis torque target value in a first just-before-stop period set in a relatively high vehicle speed range, and
        the torque command value is set based on the stopping correction torque target value in a second just-before-stop period set in a relatively low vehicle speed range.

2. The electric vehicle control method according to claim 1, further comprising:
    a basis torque target value calculation process of calculating a basis torque target value based on a required drive force for the electric vehicle, wherein
    the first just-before-stop period is set as a vehicle speed range equal to or lower than a first vehicle speed threshold value at which the stopping basis torque target value is equal to the basis torque target value, and exceeding a second vehicle speed threshold value lower than the first vehicle speed threshold value, and
    the second just-before-stop period is set as a speed range equal to or lower than the second vehicle speed threshold value.

3. The electric vehicle control method according to claim 2, wherein
    in the vibration damping process,
        in an initial calculation timing after a transition from the first just-before-stop period to the second just-before-stop period, a previous value of an input value and a previous value of an output value during filtering for calculating the stopping correction torque target value are initialized by the stopping basis torque target value calculated at the calculation timing.

4. The electric vehicle control method according to claim 2, wherein
    in the vibration damping process,
        when the torque command value is set based on the stopping correction torque target value, the setting is maintained until the stopping basis torque target value is less than the basis torque target value.

5. An electric vehicle control device configured to control a motor based on a torque command value in an electric vehicle equipped with the motor as a travelling drive source, the electric vehicle control device comprising:
    a disturbance torque estimation unit configured to calculate a disturbance torque estimation value including an influence of a road surface gradient;
    a speed parameter acquisition unit configured to acquire a speed parameter relating to a vehicle speed; and
    a vehicle state control unit configured to execute a stop process of calculating a stopping basis torque target value so as to converge the torque command value to the disturbance torque estimation value in accordance with a decrease in the speed parameter, and a vibration damping process of calculating a stopping correction torque target value by performing filtering on the stopping basis torque target value, wherein
    the vehicle state control unit is configured to
        set the torque command value based on the stopping basis torque target value in a first just-before-stop period set in a relatively high vehicle speed range, and
        set the torque command value based on the stopping correction torque target value in a second just-before-stop period set in a relatively low vehicle speed range.

* * * * *